June 16, 1959  L. H. SACK  2,890,681
BIRD FEEDER
Filed Dec. 13, 1957  2 Sheets-Sheet 1
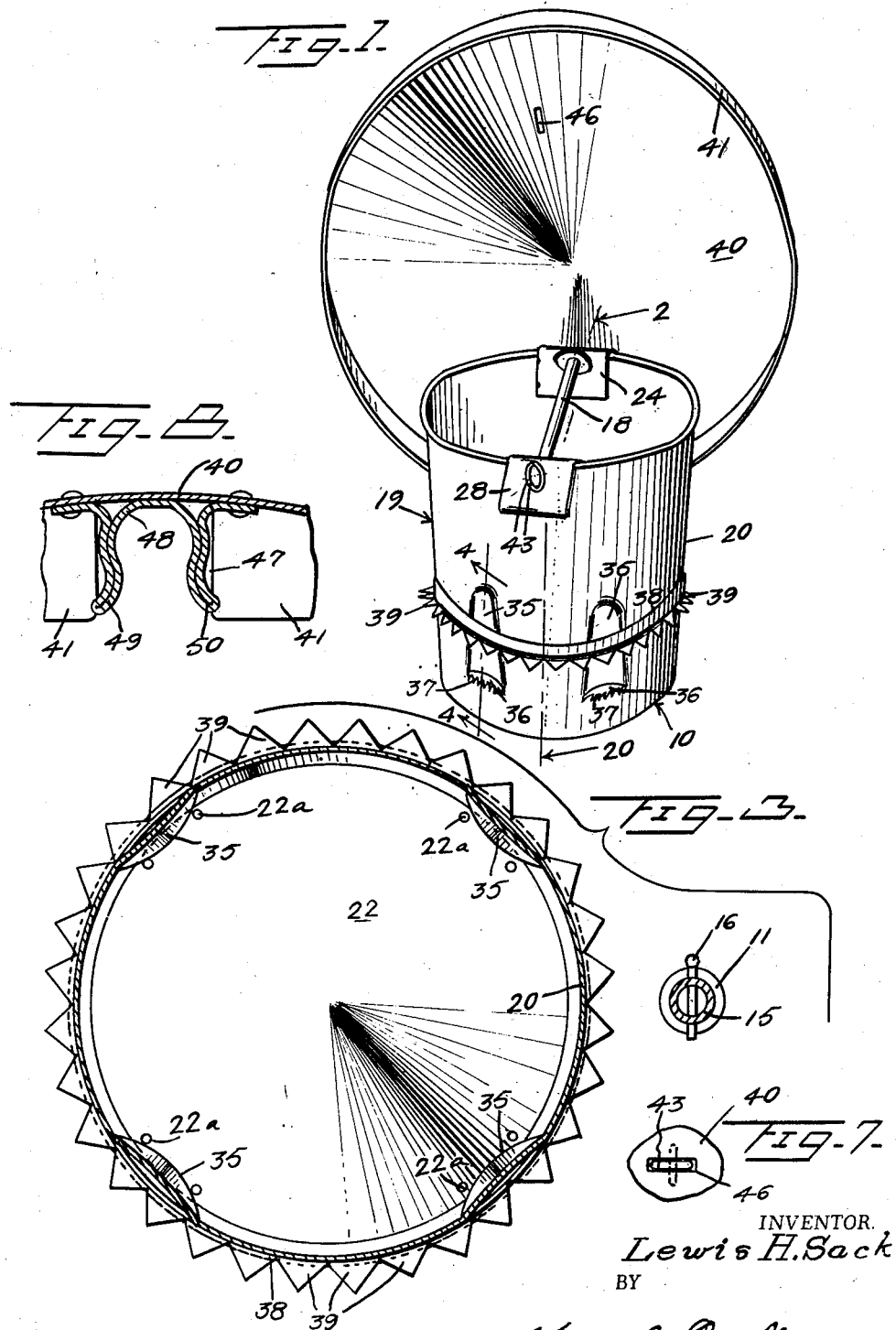
INVENTOR.
Lewis H. Sack
BY
Kimmel & Crowell ATTYS.

June 16, 1959
L. H. SACK
2,890,681
BIRD FEEDER
Filed Dec. 13, 1957
2 Sheets-Sheet 2
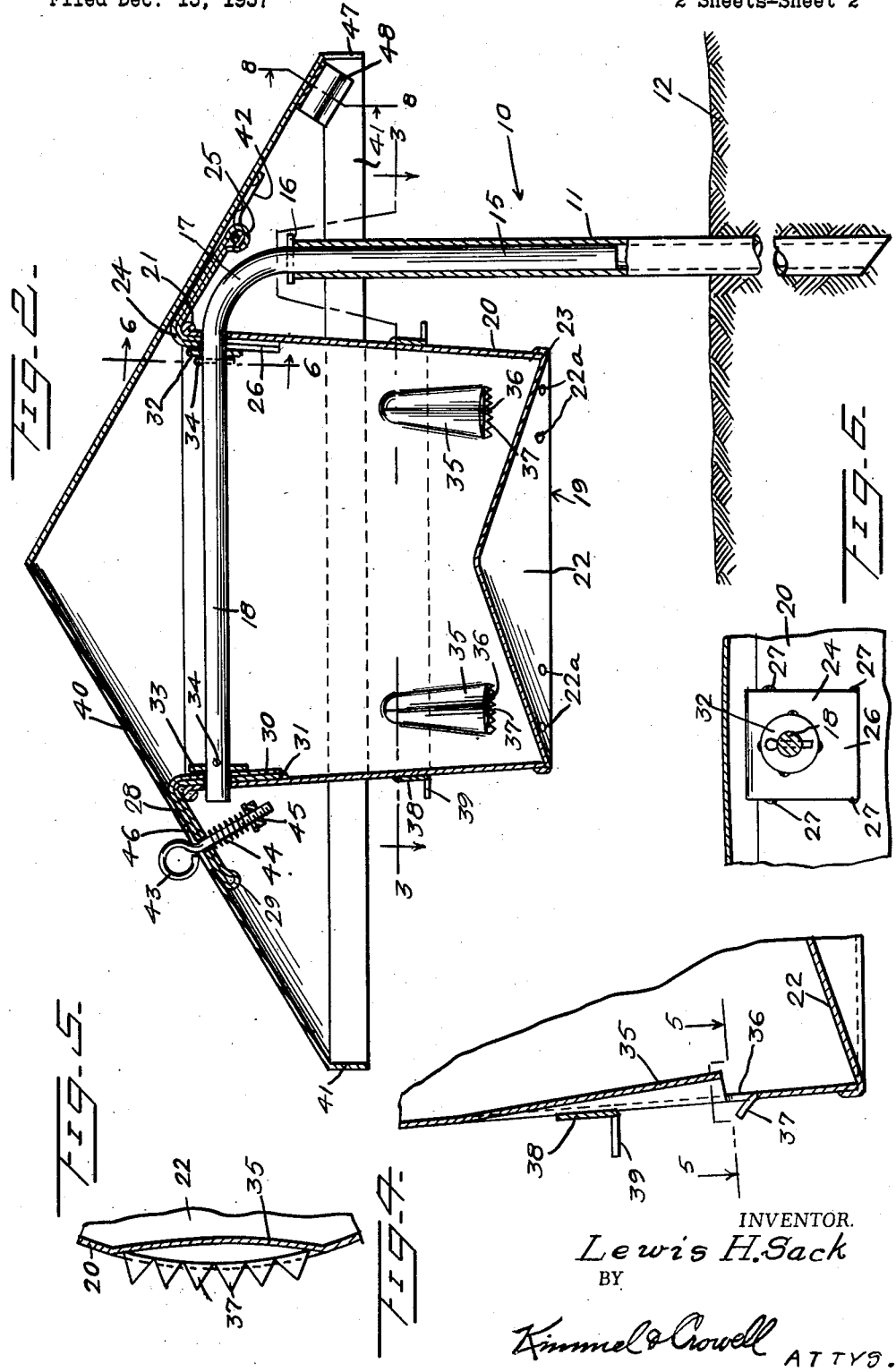
INVENTOR.
Lewis H. Sack
BY
Kimmel & Crowell ATTYS.

2,890,681
BIRD FEEDER

Lewis H. Sack, Tampa, Fla.

Application December 13, 1957, Serial No. 702,685

2 Claims. (Cl. 119—52)

The present invention relates to bird feeders, and more particularly to devices to feed birds such as pheasants, turkeys, quail, and other birds while excluding animals.

The primary object of the invention is to provide a bird feeder which is weathertight, and which is provided with means for discouraging its use by animals other than birds.

Another object of the invention is to provide a bird feeder of the class described above which is universally mounted for both vertical and horizontal swinging movement.

A further object of the invention is to provide a bird feeder of the class described above which is inexpensive to manufacture, simple to replenish, and which will automatically supply feed to the feeding stations thereof.

Other objects and advantages will become apparent in the following specification when considered in the light of the attached drawings, in which:

Figure 1 is a perspective view of the invention with the cover raised.

Figure 2 is a vertical cross-section taken along the line 2—2 of Figure 1, looking in the direction of the arrows, with the cover in lowered position.

Figure 3 is an enlarged fragmentary horizontal cross-section taken along the line 3—3 of Figure 2, looking in the direction of the arrows.

Figure 4 is an enlarged fragmentary vertical cross-section taken along the line 4—4 of Figure 1, looking in the direction of the arrows.

Figure 5 is a fragmentary horizontal cross-section taken along the line 5—5 of Figure 4, looking in the direction of the arrows.

Figure 6 is an enlarged fragmentary vertical cross-section taken along the line 6—6 of Figure 2, looking in the direction of the arrows.

Figure 7 is a fragmentary plan view of the locking eye bolt illustrating the locking position thereof in dotted lines.

Figure 8 is a fragmentary enlarged transverse cross-section taken on the line 8—8 of Figure 2, looking in the direction of the arrows.

Referring now to the drawings in detail wherein like reference characters indicate like parts throughout the several figures, the reference numeral 10 indicates generally a bird feeder constructed in accordance with the invention.

The bird feeder 10 includes an upright tubular post 11 inserted into the ground indicated at 12.

A shaft 15 is telescoped within the post 11 and is provided with a transverse pin 16 extending therethrough and engaging the top of the post 11, as best seen in Figure 2. The shaft 15 is bent arcuately at 17 and has an integral horizontal extension 18 formed thereon.

A bucket, generally indicated at 19, has an upwardly and outwardly sloping circular side wall 20 terminating in a rolled bead 21 at its upper edge and having a cone-shaped bottom wall 22 secured to its lower edge 23. The bottom wall 22 is provided with a plurality of drain apertures 22a adjacent the peripheral edge thereof.

A bracket 24 is formed from an elongated metal plate reverted to form a loop 25 at one end thereof and having the opposite end 26 extending into the bucket 19. The bracket 24 is welded at 27 to the side wall 20 of the bucket 19 with the loop 25 arranged in outwardly spaced relation with respect to the bucket 19.

A second bracket 28 is formed from an elongated strip of metal reverted at 29 to form a double thickness and having the opposite end 30 extending into the bucket 19 and welded thereto at 31. The bracket 28 is positioned transversely across from the bracket 24 and has the reverted edge 29 thereof positioned outwardly of the bucket 19.

A washer 32 is welded to the bracket 24 and a washer 33 is welded to the bracket 28 in transversely aligned relation with the horizontal portion 18 of the shaft 15 extending through the side wall 20 and the washers 32, 33. Cotter keys 34 extend through the horizontal portion 18 of the shaft 15 adjacent the washers 32, 33 to maintain the bucket 19 in position on the horizontal portion 18.

The side wall 20 of the bucket 19 is provided with a plurality of inwardly pressed recesses 35 terminating in openings 36 arranged in spaced relation to the bottom 22 of the bucket 19 and adjacent thereto. The side wall 20 of the bucket 19 is provided with a plurality of teeth 37 underlying the openings 36, for reasons to be assigned.

An annular band 38 is secured to the bucket 19 parallel to the lower edge 23 of the side wall 20 and spaced above the openings 36. The annular band 38 has a plurality of horizontal outwardly extending integral teeth 39 formed on the lower edge thereof in encompassing relation to the bucket 19.

A conical cover member 40 is supported on the brackets 24, 28 and has a depending annular flange 41 formed on the peripheral edge thereof, as best seen in Figure 2. The conical cover member 40 has a generally U-shaped bar 42 welded thereto and extending through the loop 25 of the bracket 24 to hingedly secure the conical cover member 40 to the bucket 19.

An eye bolt 43 extends through the bracket 28 and is resiliently secured thereto by means of a coil spring 44 and a nut 45. The eye bolt 43 can be turned with respect to the bracket 28 and is arranged to extend upwardly through a slot 46 in the conical cover member 40, as best seen in Figures 2 and 7.

After the cover member 40 has engaged over the eye bolt 43, the eye bolt 43 is revolved to the dotted line position shown in Figure 7, detachably locking the cover member 40 in engagement with the bracket 28.

A cut out 47 is formed in the annular flange 41 and a spring clamp 48 is secured to the cover member 40 in aligned relation thereto. The spring clamp 48 has a pair of jaws 49, 50 arranged to engage over and grasp the post 11 to maintain the cover 40 in raised position during filling operations.

In the use and operation of the invention, the cover 40 is opened and the bucket 19 is filled with dry feed. The cover 40 is then closed and locked with the eye bolt 43. The teeth 37 and the teeth 39 serve to prevent pigs, cattle, and other animals from disturbing the bucket 19 and the birds are permitted to feed through the openings 36 without hinderance from other animals.

The conical cover 40 keeps the feed dry in the bucket 19 and the pivotal mounting of the bucket 19 on the horizontal portion 18 of the shaft 15, and the pivotal mounting of the shaft 15 in the post 11 serve to permit the bird feeder 10 to swing freely when struck by animals to thus prevent the feeder 10 from being broken.

Having thus described the preferred embodiment of the invention, it should be understood that numerous structural modifications and adaptations may be resorted to without departing from the scope of the appended claims.

What is claimed is:

1. A bird feeder comprising a hollow post supported in the ground, an upright shaft journalled in said hollow post, a horizontal extension integrally secured to the upper end of said shaft, a bucket having a pair of spaced aligned holes adjacent the upper edge thereof, a bracket secured to the upper edge of said bucket, a second bracket secured in diametrically opposed relation to the upper edge of said bucket, said horizontal portion of said shaft extending through said brackets and said aligned holes in said bucket, with said bucket being journalled on said horizontal extension and depending therefrom, a plurality of feeder recesses formed in said bucket adjacent to but spaced from the bottom edge thereof, teeth formed in said bucket underlying said feeder recesses, a plurality of teeth arranged annularly of said bucket, a conical cover overlying said bucket, means hingedly securing said cover to said bucket, and means detachably latching said cover to said bucket, said means hinging said cover to said bucket being connected to one of said brackets and the means latching said cover to said bucket being connected to the other of said brackets.

2. A device as set forth in claim 1 wherein said second named teeth are positioned adjacent to and above said first named teeth.

References Cited in the file of this patent

UNITED STATES PATENTS

| 1,796,466 | Lage | Jan. 19, 1931 |
| 2,636,474 | Parker | Apr. 28, 1953 |
| 2,666,415 | Scruggs | Jan. 19, 1954 |
| 2,705,938 | Greenough | Apr. 12, 1955 |
| 2,804,844 | Gigliotti | Sept. 3, 1957 |